W. A. HELM.
TIRE PROTECTOR.
APPLICATION FILED MAR. 24, 1919.
1,340,608.
Patented May 18, 1920.
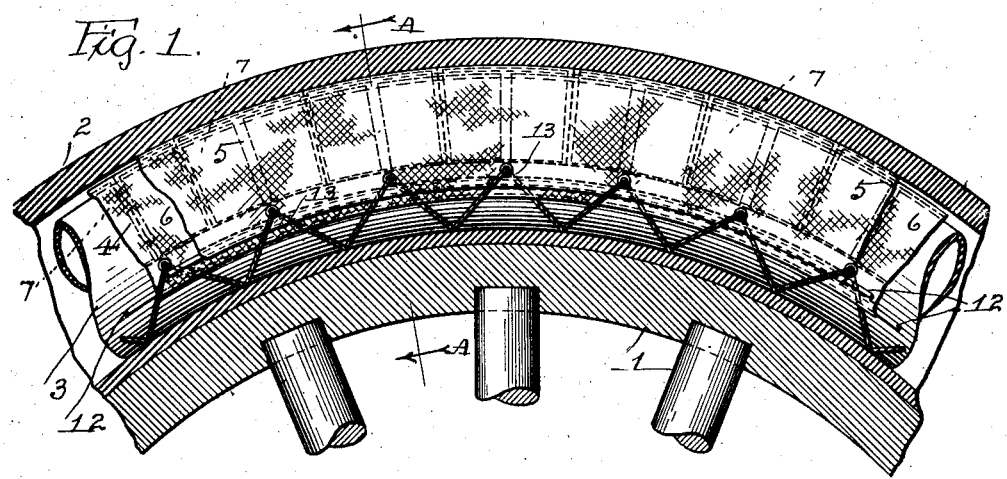
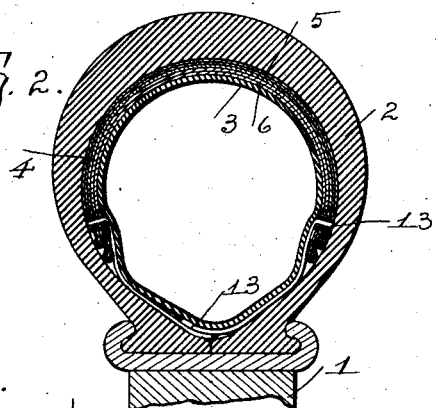
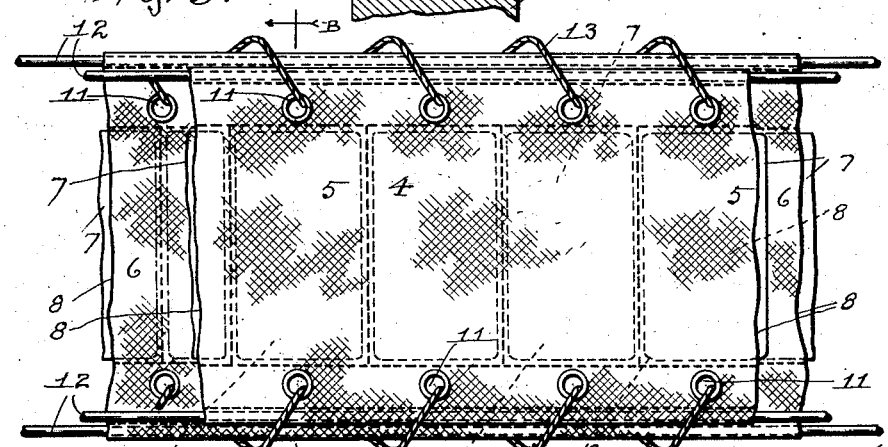
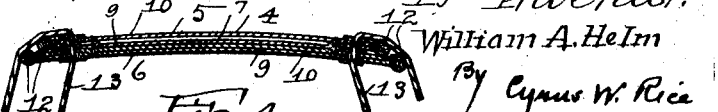
Inventor:
William A. Helm

UNITED STATES PATENT OFFICE.

WILLIAM A. HELM, OF TRAVERSE CITY, MICHIGAN.

TIRE-PROTECTOR.

1,340,608.   Specification of Letters Patent.   Patented May 18, 1920.

Application filed March 24, 1919. Serial No. 284,727.

*To all whom it may concern:*

Be it known that I, WILLIAM A. HELM, a citizen of the United States, residing at Traverse City, in the county of Grand Traverse and State of Michigan, have invented new and useful Improvements in Tire-Protectors, of which the following is a specification.

The present invention relates to tire protectors or armor, *i. e.* such devices as are used to protect pneumatic tires against puncture and the like; and its object is, generally, to provide an improved device of that character which may be removably secured between the casing and the inner tube of such a tire; and more particularly, to provide in such a device protecting plates or armor of such material as will render the device very efficient; and further, to provide two separable carrier members for the device, each having protecting plates so disposed that in the assembled position of said members the plates of one member break joints with those of the other; and further, to provide for such members means for readily assembling and mounting the same in such relation that the plates carried by one of said members will necessarily break joints with the plates carried by the other member.

These and any other objects hereinafter appearing are attained by, and the invention finds preferable embodiment in, the structure hereinafter described and illustrated by the accompanying drawings, in which:—

Figure 1 is a side view of a segment of a vehicle wheel provided with a pneumatic tire;

Fig. 2 is a transverse section thereof taken on line A—A of Fig. 1;

Fig. 3 is a development of the tire protector; and

Fig. 4 is a transverse section of the same taken on line B—B of Fig. 3.

The vehicle wheel 1 (being an automobile wheel), is provided with a pneumatic tire of common form comprising a casing 2 and an inflated inner tube 3. The tire protector, designated generally 4, is removably secured between said casing and inner tube, and comprises two carrier members 5, 6, practically identical, one of which overlies the other. Protecting plates 7 are carried edge toward edge, by each of these carrier members, being preferably inclosed and held against displacement in pockets 8 formed between the inner ply 9 and outer ply 10 of the carrier members respectively. These carrier members may be made of canvas or asbestos fabric preferably rubberized or impregnated with rubber. Along the side edges of each of the carrier members is a row of lacing holes 11 and in order to strengthen the same against tearing outwardly, rods 12, as of flexible wire, are carried by the carrier members parallel to their side edges and outside the rows of holes. Lacing 13 is passed through these holes and around the inner side of the inner tube to securely hold the carrier members in position. The lacing holes of the carrier members are so disposed relatively to the position of the plates that when the holes of one carrier member are brought into registration with the holes of the other carrier member, the plates of one said member will break joints with those of the other member. By passing the lacing through the registering holes the two carrier members are held in assembled position in the tire in such manner that this breaking of joints is securely and necessarily maintained.

It will be understood that the series of plates extends entirely around the wheel in the direction of its and the tire's circumference. Inasmuch as the carrier members are separable, they may be disassembled and then assembled in another interrelative position, thus improving the wearing qualities of the device.

I have found that plates made of celluloid are peculiarly serviceable. This material is flexible, and sufficiently hard to resist puncturing very well: it is capable of receiving a deep denting blow or other distortion without being perforated, and when so dented or distorted returns to normal shape under the pneumatic pressure of the inflated tire more readily than plates made of any other suitable material of which I am aware.

It will be seen that the plates are slightly spaced apart in the series, and held in such spaced relation by the pockets. This is done in order to prevent possible overlapping of the edges of adjacent plates, when the tire is not fully inflated.

The invention being intended to be pointed out in the claims, is not to be limited to or by details of construction shown or described.

I claim:

1. In a tire protector; a carrier member of rubberized asbestos fabric removably secured between the tire's casing and inner tube; a series of flexible celluloid plates carried by said member, edge toward edge, said series extending in the direction of the tire's circumference.

2. A tire protector removably secured between the tire's casing and inner tube, and having adjacent its side edges rows of lacing holes, and having rods parallel to said edges and outside the rows of holes; lacing passing through the holes and around the inner side of the inner tube.

3. In a tire protector; at least two separable carrier members removably secured between the tire's casing and inner tube, one of said members overlying the other; a series of protecting plates carried by each of said members, edge toward edge, and extending in the direction of the tire's circumference; each of the carrier members having adjacent its side edges rows of lacing holes, the holes of one of said members registering with those of the other member in that relative position of said members in which the plates carried by one of said members break joints with the plates carried by the other member; lacing passing through the registering holes in both members and around the inner side of the inner tube.

In testimony whereof I have hereunto set my hand at Grand Rapids, Michigan, this 20th day of March, 1919.

WILLIAM A. HELM.